United States Patent Office 2,835,193
Patented May 20, 1958

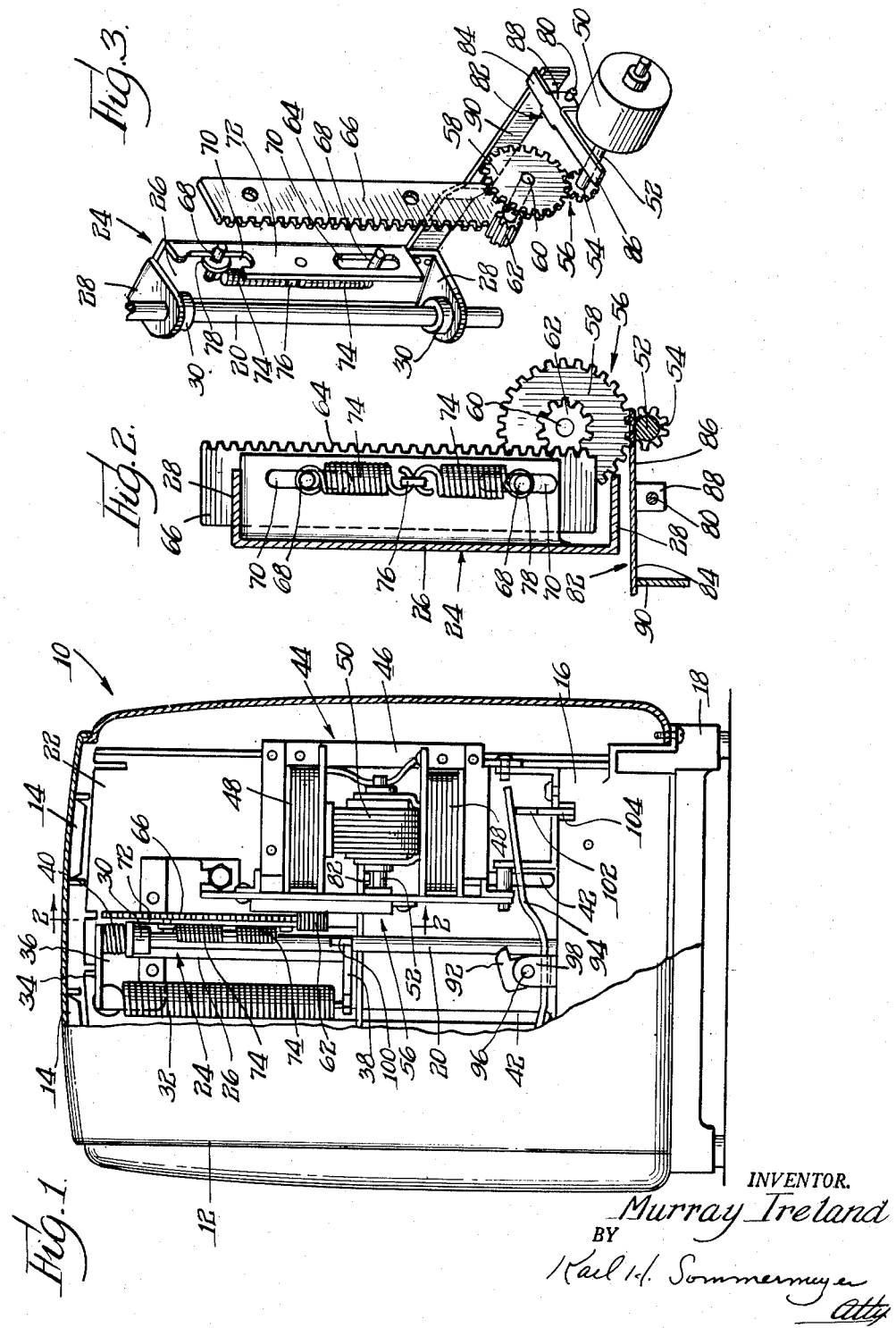

2,835,193

POWER DRIVE FOR AUTOMATIC TOASTER

Murray Ireland, Elgin, Ill., assignor to McGraw-Edison Company, a corporation of Delaware Application July 1, 1953, Serial No. 365,425

2 Claims. (Cl. 99—391)

This invention is concerned generally with an automatic toaster and more particularly with a drive mechanism therefor.

There are several different types of automatic toasters. In the most advanced of such types, no manual effort is needed to operate the toaster. All that is necessary is to drop in a slice of bread. The weight of the bread actuates a mechanism to lower the bread to toasting position and energizes the toasting heater. Suitable timing mechanism thereafter terminates the energization of the toasting heater and initiates return of the toasted bread to a position from which it may be grasped for removal from the toaster. In order to effect lowering and raising of bread before and after toasting without any manual effort, a geared motor may be used for moving the toast carrier in one direction and a spring for moving the carrier in the opposite direction. Because of the inertia of the motor, quick starting and stopping of such movement may be accompanied by substantial physical shock to the driving mechanism. Such physical shock causes undue noise and tends to wear out the driving mechanism prematurely. Furthermore, there is always the chance that such shock, particularly if accompanied by rebound, might accidentally initiate a succeeding toasting cycle.

An object of this invention is to provide a resilient drive connection for an automatic toaster.

Another object of this invention is to provide a brake for stopping a toaster drive mechanism quickly and smoothly when the toast carrier reaches a limiting position.

More specifically, it is an object of this invention to provide an automatic toaster with a brake for quickly stopping the rotation of the drive motor when the toast carrier reaches a limiting position.

A further object of this invention is to provide an automatic toaster with a resilient drive connection between a motor and a toast carrier in combination with a brake for said motor automatically actuated as the carrier reaches a limiting position.

Other objects and advantages of the present invention will be apparent from the following description when taken in connection with the accompanying drawings wherein:

Fig. 1 is an end view of a toaster constructed in accordance with the principles of my invention with part of the casing broken away;

Fig. 2 is a sectional view taken along the line 2—2 of Fig. 1; and

Fig. 3 is a perspective view of the toaster drive mechanism.

Referring first to Fig. 1, there is shown a toaster 10 having a casing 12 with a pair of lonigtudinal openings defined in its upper surface by down-turned flanges 14 for receiving bread to be toasted. The casing 12 is mounted on a frame shown in part at 16, and the casing and frame are supported by end pieces 18 of plastic or other material of low thermal conductivity which are intended to rest upon a supporting surface.

A vertical rod 20 is fixed to the toaster frame adjacent a plate 22 at one end of the toasting chamber or oven, and a carriage 24 is vertically reciprocable on this rod. The carriage includes a vertical back plate 26 with a pair of horizontal flanges 28 which are suitably apertured to accommodate the rod. The bushings 30 are affixed to the flanges 28 and encircle the rod for improved reciprocating motion.

A coil spring 32 is stretched between a flange 34 on a bracket 36 mounting the upper end of the rod 20 and an arm 38 projecting lateral from the lower portion of the carriage. This spring normally urges the upper flange 28 of the carriage up against a spring stop 40.

Vertical slots 42 are provided in the end plate 22 and suitable members (not shown) extend through these slots to receive and support bread slices for toasting. These members are mounted in such manner as to be moved a sufficient distance by the weight of the bread to actuate a control circuit, the details of which are not of importance to this invention and which are not shown. It will be understood that these members shift vertically with the carriage 24 to shift bread to and from toasting position.

A small electric motor 44 including a frame 46, stator windings 48 and a rotor or armature 50 is suitably supported from the frame 16 of the toaster. The motor shaft 52 has a small pinion gear 54 fixed on its end and forming a part of a gear reducer 56. The gear reducer also includes a larger gear 58 meshing with the gear 54, the gear 58 being fixed on the output shaft 60 of the gear reducer. The output shaft 60 carries a small pinion gear 62 which meshes with the teeth 64 of a rack 66.

The rack 66 is provided with a pair of laterally extending pins 68. In Fig. 3 these pins have been shown as detached from the rack in order that the individual parts of the invention may be more readily illustrated. These pins project through elongated vertical slots 70 in a vertical flange 72 projecting at a right angle from the back wall 26 of the carriage 24. The ends of the pins 68 projecting through the slots 70 preferably are provided with annular grooves for retaining the ends of a pair of coil springs 74, the other ends of this pair of springs being secured to a common ear or lug 76 located midway between the slots 70. These springs are of substantially identical construction and tend to centralize the pins 68 in the slots 70 so that the carriage 24 and the rack 66 will move as a unit, but with a limited amount of relative permissive movement. Washers 78 are placed over the pins and between the flange 72 and springs 74 and form a tight fit on the pins so as to prevent wobble between the rack 56 and the flange 72.

A fixed pin 80 is supported by a suitable part of the toaster, such as a bracket on the frame 16. A brake lever 82 is pivotally mounted on this pin and includes a rear arm 84 and a front arm 86 projecting at right angles from a pair of down-turned ears 88 which are suitably apertured to receive the pin 80. The front arm 86 overlies the motor shaft 52 and swings against it as the brake 82 rocks on pin 80. The carriage 24 is provided with a laterally projecting arm 90 which underlies the rear arm 84 of the brake lever and is arranged to engage this arm of the brake lever to pivot the lever about the pin 80 into engagement with the motor shaft 52 when the carriage reaches raised position to brake the motor.

The spring 32, as previously noted, tends to hold the carriage in its raised position as shown in Fig. 1. When the carriage is lowered by the motor 44, as will be disclosed shortly, it is caught and held in fully lowered position by a hook 92 mounted on or formed integral with a lever 94 which is pivoted on a pin 96 carried by a bracket 98 on the toaster frame 16, the hook 92 being engageable with a forwardly projecting flange or arm 100 on the carriage 24. The lever 94 is held in a position rotated slightly clockwise to that shown in Fig. 1 by a tooth 102 on a lever 104 in order to retain the carriage in lowered position. The lever 104 is connected with a suitable timing mechanism, preferably a thermal timer, so that the lever 94 is released from the tooth 102 after a predetermined time for return to the position shown in Fig. 1 under the action of a spring (not shown) which may encircle the pin 96, the carriage thereby being freed for return to its upper position by the spring 32.

In order to toast slices of bread in the toaster shown, all that is necessary is to drop the slices through the slots defined by the downturned flanges 14. The weight of the bread actuates a suitable mechanism (not shown) to close a switch which effects energization of the motor 44. The motor then runs to lower the carriage 24 through the pinion 62 and rack 66. When the carriage reaches lowered position, the arm 100 thereon strikes the lever 94 to pivot it into locking position, the springs 74 cushion the momentum of rotor 50 and another mechanism (not shown) is operable to deenergize the motor and to energize the toasting coils (not shown). After a predetermined time, the arm 104 is moved to release the lever 94 from beneath the tooth 102 to allow the lever 94 to pivot to the position shown, thereby releasing the carriage which rapidly returns to its raised position under the impetus of the spring 32, the toasting coils at the same time being deenergized. This upward motion rotates the motor rotor 50, the inertia of which retards the upward acceleration of the carriage. The carriage stops against spring bumper 40 while springs 74 again provide a soft cushion for the momentum of rotor 50. In addition, the bracket 90 on the carriage lifts arm 84 of brake 82 and forces the braking arm 86 against rotor shaft 52. As the spring 74 is distended by the momentum of rotor 50 the upward force thereby applied to the carriage is received partly by spring 40 and partly by brake 82.

It should be apparent that when the carriage is moved down by the motor 44 or up by the spring 32 the motor rotor 50 accelerates to a fairly high speed. Then when the carriage strikes a stop the force of decelerating and stopping the rotor is transmitted through the gears to the rack 66. If the rack were fixed to the carriage, this deceleration would impose a severe strain on the gears and increase the shock of stopping. Even without spring 40, since the structural parts have some unavoidable resilience, such a shock at the end of the upward motion would also tend to induce a rebound of the carriage and motor, which might cause a faulty restarting of the toaster cycle.

In the drive mechanism herein disclosed the springs 74 permit the rack to move relative to the carriage. Consequently when the carriage hits its stop, the springs 74 limit the decelerating force that is applied to the rotor 50 and absorb its rotational energy. Accordingly the carriage and rotor 50 are brought to a smooth stop with little or no shock to the mechanism. Furthermore, the brake 82 constitutes a part of the upper stop for the carriage. When the carriage stops against this brake, the momentum of rotor 50 continues to drive the rack up against the springs 74. The tension developed in springs 74 by the upward movement of rack 66 increases the force with which brake 82 is applied to rotor shaft 52. Thus, not only do the springs 74 themselves apply a smoothly increasing decelerating force to the rotor 50, but they also apply a smoothly increasing pressure to the brake 82. The springs 74 alone are capable of absorbing the momentum of the rotor 50 and bringing it to a quick, though not instantaneous, shock-free stop. The brake 82, actuated by the springs 74 and the carriage, not only provides an additional shock-free decelerating force, but also quickly absorbs the energy of motion of the rotor and so dampens any incipient rebound.

The specific example of my invention herein shown and described is for illustrative purposes only. Various changes in structure are possible and constitute a part of my invention insofar as they fall within the spirit and scope of the appended claims.

I claim:

1. A toaster drive mechanism comprising a carriage, means for guiding said carriage between toasting and non-toasting positions, a rotary motor having a drive shaft driving a pinion, a rack engaging said pinion, means for mounting said rack on said carriage free for limited movement relative to said carriage in the direction of movement of said carriage, opposed spring means interconnecting said carriage and said rack for resiliently moving said rack and said carriage as a unit, said motor being effective through said pinion, rack, and opposed spring means to drive said carriage from one of said positions to the other, a spring for returning said carriage from the latter position to the former, means for stopping said carriage at the former position, a lever pivotally mounted on a fixed part and engageable with said motor shaft, and a laterally projecting arm on said carriage engageable with said lever as said carriage is stopped by said stopping means to pivot said lever into engagement with said motor shaft for frictionally arresting said motor.

2. An automatic toaster comprising a casing providing therein a space to be heated and being apertured to receive bread slices on a support for toasting therein, a support carriage, means mounting said carriage in said casing for guided movement between toasting and non-toasting positions, means for moving said carriage between toasting and non-toasting positions and including a rotary motor having rotating shaft means including a resilient connection with said carriage for moving the said carriage in one direction, a stop member, means mounting said stop member on said carriage for movement therewith, and a brake lever pivoted on a fixed part of said casing with a first portion thereof positioned for engagement with said rotating shaft means between the motor and the carriage and having a further portion positioned in the path of movement of said stop member and operating as a positive abutment for said stop member with the resilient connection absorbing shock incident thereto whereby, upon mutual abutment between the stop member and the lever, the first portion of the lever will be urged into engagement with the rotating shaft means for frictionally stopping said motor.

References Cited in the file of this patent

UNITED STATES PATENTS

| | | |
|---|---|---|
| 476,388 | Judson | June 7, 1892 |
| 1,324,587 | Elliott | Dec. 9, 1919 |
| 1,383,851 | Pombo | July 5, 1921 |
| 1,750,736 | Volle | Mar. 18, 1930 |
| 1,962,475 | Blodgett | June 12, 1934 |
| 2,266,301 | Biebel | Dec. 16, 1941 |
| 2,347,385 | Wright et al. | Apr. 25, 1944 |
| 2,347,611 | Purpura | Apr. 25, 1944 |
| 2,615,386 | Palmer | Oct. 28, 1952 |